United States Patent [19]

Bentensky et al.

[11] Patent Number: 5,155,517
[45] Date of Patent: Oct. 13, 1992

[54] OPTICAL SYSTEM WITH IMPROVED FIELD MASK

[75] Inventors: Ellis I. Bentensky, W. Redding, Conn.; Paul L. Ruben, Penfield, N.Y.

[73] Assignee: Eastman Kodak Company, Rochester, N.Y.

[21] Appl. No.: 699,286

[22] Filed: May 13, 1991

[51] Int. Cl.⁵ .................................. G03B 13/00
[52] U.S. Cl. .................................. 354/222; 354/225
[58] Field of Search .................. 354/219–225; 359/643–647, 676–678

[56] References Cited

U.S. PATENT DOCUMENTS

| | | | |
|---|---|---|---|
| 4,545,655 | 10/1985 | Fantone et al. | 354/225 |
| 4,707,103 | 11/1987 | Ikemori et al. | 354/225 |
| 4,838,668 | 6/1989 | Betensky et al. | 354/222 |
| 4,887,109 | 12/1989 | Fujita et al. | 354/222 |
| 4,972,216 | 11/1990 | Ueda et al. | 354/225 |
| 5,014,078 | 5/1991 | Kudo et al. | 354/222 |
| 5,052,787 | 10/1991 | Sugawara | 359/683 |

FOREIGN PATENT DOCUMENTS

| | | |
|---|---|---|
| 1-116617 | 5/1989 | Japan . |
| 1-131510 | 5/1989 | Japan . |
| 1-197717 | 8/1989 | Japan . |
| 1-233430 | 9/1989 | Japan . |
| 1-309020 | 12/1989 | Japan . |

Primary Examiner—L. T. Hix
Assistant Examiner—David M. Gray
Attorney, Agent, or Firm—Svetlana Z. Short

[57] ABSTRACT

A real image zooming viewfinder has an internal real image that drifts between two optical components. The field mask is placed at the internal image location and is of a thickness equal to or greater than the drift distance.

8 Claims, 2 Drawing Sheets

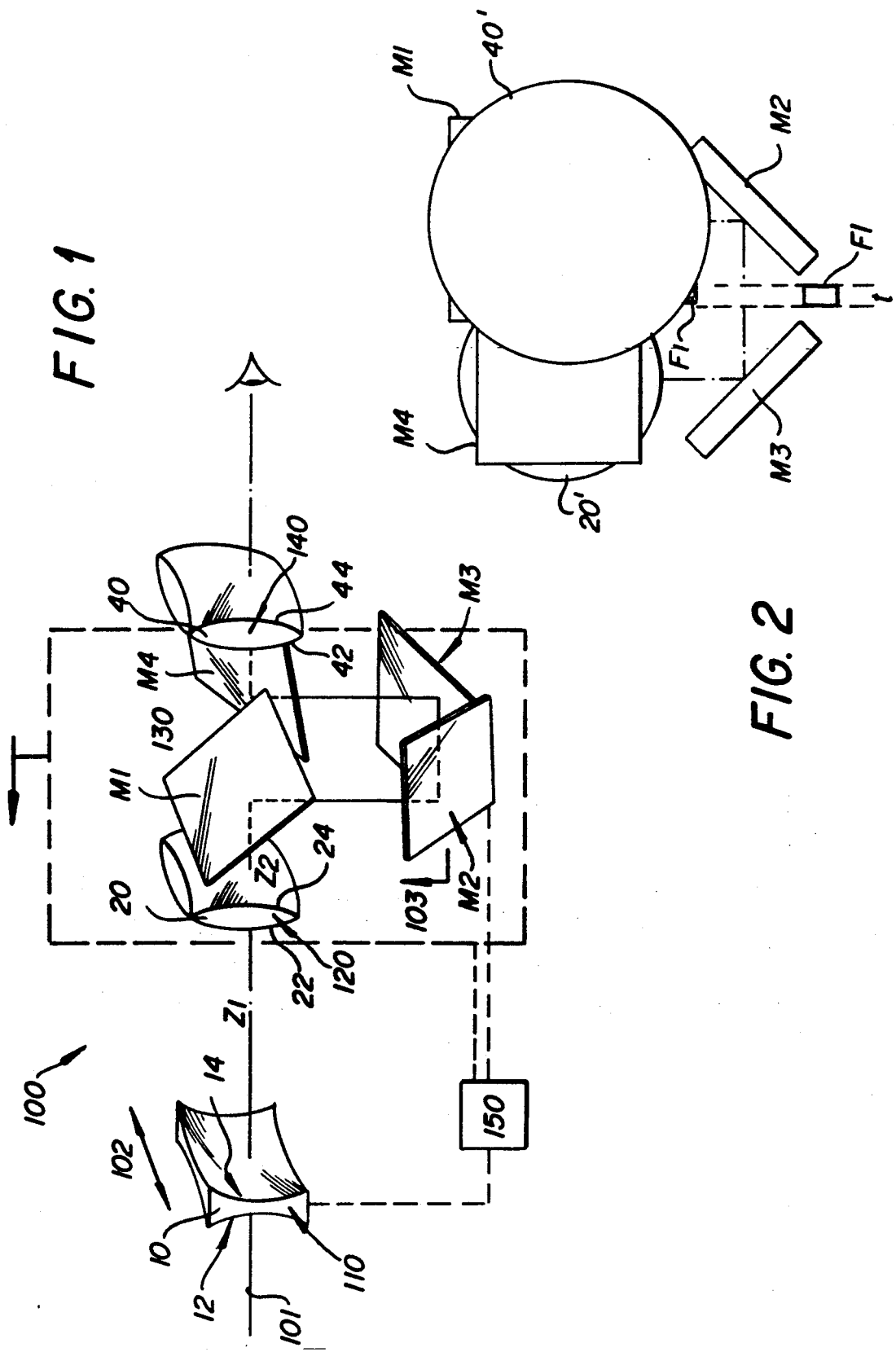

OPTICAL SYSTEM WITH IMPROVED FIELD MASK

CROSS-REFERENCE TO RELATED APPLICATIONS

This application is related to U.S. patent application Ser. No. 699,012, filed May 13, 1991 and entitled REAL IMAGE ZOOM VIEWFINDER, filed in the names of Betensky et al. and application Ser. No. 699,284, filed May 13, 1991, and entitled REAL IMAGE VIEWFINDER REQUIRING NO FIELD LENS, filed in the names of Betensky et al.

BACKGROUND OF THE INVENTION

1. Field of the Invention

The invention relates to optical systems such as zoom viewfinder systems.

2. Description Relative to the Prior Art

Cameras using zoom lens systems are well known. In such cameras viewing of the scene by the operator is facilitated by providing a viewfinding device, i e., a viewfinder that allows the operator to view the object whose image is being recorded by the camera. In those cameras providing through the lens reflex viewing, the image of the object is viewed immediately prior to exposure by using a mirror which is moved before exposure of the film. Camera cost savings may be realized by eliminating the reflex viewing system. However, a need arises to provide a viewing system separate from the exposing system and to have said viewing system be provided with the ability to continuously vary the angular field of view, popularly referred to as zooming. Heretofore, zoom viewfinders of the Galillean type have been suggested. However, because zoom viewfinders of the Galillean type become increasingly large and complex when designed to the 2:1 and greater variable power range and because they have a poorly delineated field of view, other known systems consisting of a zooming objective as the first portion followed by an eyepiece have been developed. While these other systems can be designed for large variable power ranges, they also can become large and complex because of the need for an erecting means. Other systems also employ a field mask to delineate the boundaries of the field of view. This field mask is fixed at the image plane location and is located at the front focal plane of the eye lens element. The field mask is embodied as a clear opening in a thin opaque material. This type of a fixed or stationary field mask is not acceptable for use in an optical system having a drifting image plane. While a movable field mask may be provided, additional means is required to move same thereby adding complexity to such systems.

SUMMARY OF THE INVENTION

It is, therefore, one object of the invention to provide a compact zoom viewfinder or the like that is relatively inexpensive. These and other objects of the invention, which will become apparent from a reading of this specification, are realized by an optical system, such as a zoom viewfinder, having a plurality of optical components defining an internal image that drifts between the optical components. In the embodiments described herein, such finders have a three-dimensional field mask with a thickness approximately equal to or greater than the size of the image plane drift.

BRIEF DESCRIPTION OF THE DRAWINGS

Embodiments of the present invention will now be described, by way of example, with reference to the accompanying drawings, in which:

FIG. 1 is a diagram in perspective of a first embodiment of a zoom viewfinder.

FIG. 2 is a diagram of the rear view of the zoom finder of FIG. 1.

DETAILED DESCRIPTION OF THE PREFERRED EMBODIMENTS

First Illustrative Embodiment

Figure 3:
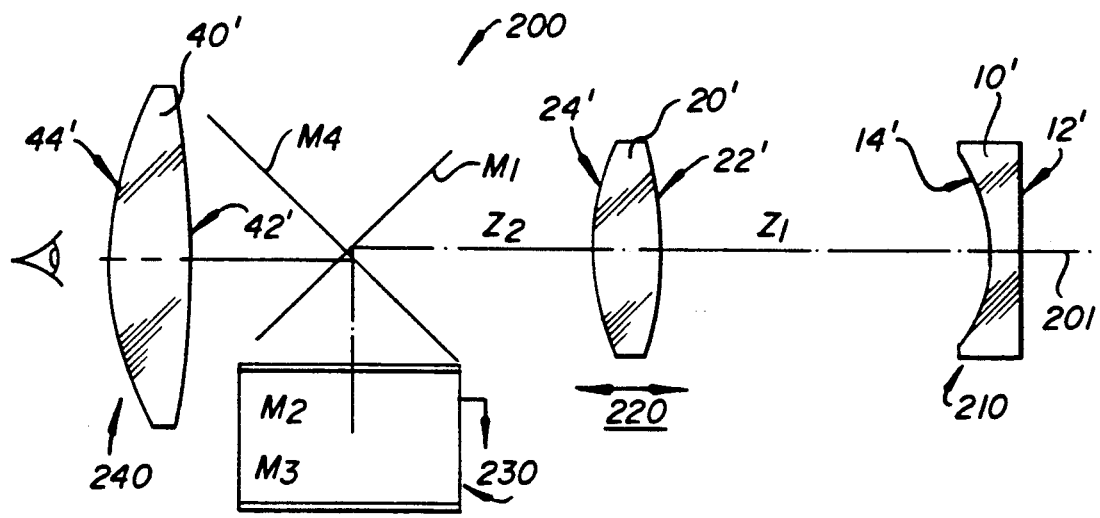
FIG. 3 is a diagram of a second embodiment of a zoom viewfinder.

The viewfinder 100 represented in FIG. 1 is a 2.3×real image zoom viewfinder. The viewfinder 100 has an optical axis 101 and includes four optical units 110, 120, 130 and 140. The optical unit 110 of the first embodiment is stationary and consists of a negative lens component 10. Lens component 10 serves as a negative objective and is fixed, i.e., it is held stationary during zooming. However, it could be made to move along the optical axis 101 to provide further compensation for the image shift during zooming. Lens component 10 is a single biconcave lens element having a front surface 12 and a rear surface 14. Surface 14 has a smaller radius of curvature than surface 12 and thus is more powerful than surface 12. Surface 14 is also aspherical. The specific parameters describing this lens element are given in Table 1.

The second optical unit 120 moves axially back and forth along the optical axis 101 as a variator during zooming and effects a change in magnification. It consists of a positive lens component 20. Lens component 20 is a single biconvex lens element having a front surface 22 and a rear surface 24. Surface 24 is an aspherical surface. The specific surface parameters for the lens element 20 are also given in Table 1.

Figure 4:
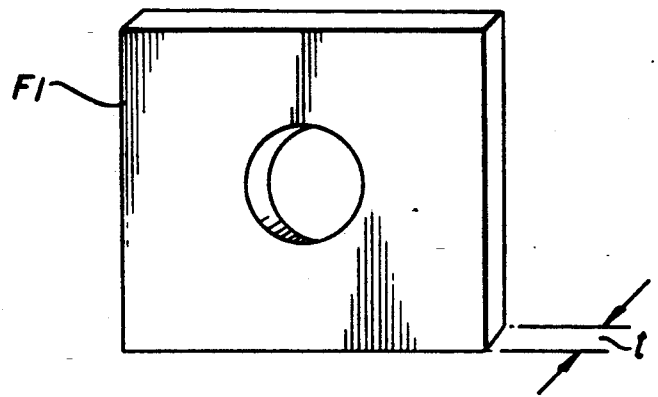
FIG. 4 is a diagram of a field stop/field mask.

The third optical unit is a reflective assembly 130. The reflective mirror assembly 130 consists of 4 mirrors: M1, M2, M3 and M4, arranged in a type-2 Porro prism-like configuration. Mirrors M1, M2, M3 and M4 move axially back and forth along the optical axis 101 at the same rate as the optical unit 120. Thus, mirror assembly 130 and the second optical unit 120 can be moved together by the gearing mechanism 150. The mirror assembly 130 inverts (erects) and, reverts the image. The magnification of the finder is changed by moving a pair of mirrors M2 and M3 vertically while moving optical unit 120. This may be made using an appropriate gear and cam mechanism 150. The vertical movement of these two mirrors (M2 and M3) in the direction of arrow 103 provides a variable optical path length and thus compensates for the image plane drift introduced or caused by the variator motion, i.e., second unit (120) motion. A real image is formed between the second and third mirrors, shown in FIG. 2 so the field stop F1 or mask may be located there. Because the image plane drifts axially between the two mirrors, the field stop/field mask F1 can be made to move with the image. However, in accordance with the invention, an improved expedient is to have the field stop be of a thickness that is substantially equivalent to the image plane drift distance, thus, provision of a device for moving the field stop separately is eliminated. In this embodiment the image plane drifts by 1.04 mm; therefore, a field stop F1 thickness, t (FIG. 4), of about 1.1 mm or greater is adequate.

The fourth optical unit 140 which is a rearmost unit, contains a positive lens component 40 and is stationary. Lens component 40 is a biconvex lens element having a front surface 42 and a rear surface 44. Lens component 40 serves as an eye lens and is held stationary, i.e., fixed during zooming.

In addition to the motions of the variator (120) and two mirrors (M2 and M3) required to provide zooming, the front negative lens component 10 may be advantageously displaced laterally, i.e., perpendicularly to the optical axis 101 as indicated by arrows 102, to provide parallax compensation. For a zoom taking lens to viewfinder optical axes separation of 50 mm, to correct parallax from infinity to 0.5 meters, the front lens component 10 should be displaced 0.71 mm.

Various constructional parameters of the optical system, when in its short focal length conditions, are given in Table 1.

TABLE 1

|  | RADIUS | THICKNESS | MATERIAL TYPE |
|---|---|---|---|
| Lens element 10 | −85.988 | 1.00 | acrylic |
|  | 4.933(3) | Z1 (1) |  |
| Lens element 20 | 13.759 | 2.50 | acrylic |
|  | −7.959(4) | Z2 (2) |  |
| Lens element 40 | 25.240(5) | 3.00 | acrylic |
|  | −12.443 | 22.39 |  |
|  | PUPIL OF EYE |  |  |

NOTES:
(1) (2) Zoom space. Refer to ZOOM DATA TABLE. TABLE 3.
(3) (4) (5) Aspherical surface. Sag Z is defined per following formula:

$$z = \frac{cy^2}{1 + \sqrt{[1 - (1 + k)c^2y^2]}} + Dy^4 + Ey^6 + Fy^8 + Gy^{10} + Hy^{12} + Iy^{14}$$

where 1/C is radius of curvature for the surface, and k is the conic constant of the surface. y is the marginal ray height, and where D, E, F, G, H and I are defined in TABLE 2.

TABLE 2

POLYNOMIAL ASPHERES
(COEFFICIENTS OF THE EVEN POWERED TERMS)

| NO. | D (4th) | E (6th) | F (8th) |
|---|---|---|---|
| (3) | 1.3882E − 03 | 1.5508E − 05 | −9.3330E − 06 |
| (4) | 8.6265E − 04 | −1.3786E − 04 | 2.1750E − 05 |
| (5) | −7.1589E − 05 | −3.2260E − 06 | 1.5573E − 08 |

| NO. | G (10th) | H (12th) | I (14th) |
|---|---|---|---|
| (3) | 4.2796E − 07 | 6.9955E − 08 | 5.6732E − 09 |
| (4) | −1.0064E − 06 | −5.6207E − 08 | 4.3911E − 09 |
| (5) | 1.5367E − 09 | 5.6142E − 12 | −8.8297E − 13 |

All dimensions throughout this specification are in millimeters unless otherwise stated.

The spaces between lens component 20 and lens component 30, i.e., air space Z1, as well as including those corresponding to magnification at the extremes, are shown in TABLE 3.

TABLE 3

ZOOM DATA TABLE

| MAGNIFICATION | AIR SPACE Z1 | AIR SPACE Z2 |
|---|---|---|
| .351 | 16.500 | 2.626 |
| .390 | 14.851 | 2.391 |
| .430 | 13.476 | 4.173 |

TABLE 3-continued

ZOOM DATA TABLE

| MAGNIFICATION | AIR SPACE Z1 | AIR SPACE Z2 |
|---|---|---|
| .470 | 12.333 | 4.957 |
| .486 | 11.929 | 5.270 |
| .510 | 11.372 | 5.738 |
| .550 | 10.548 | 6.522 |
| .590 | 9.840 | 7.301 |
| .630 | 9.218 | 8.085 |
| .670 | 8.672 | 8.867 |
| .710 | 8.187 | 9.649 |
| .752 | 7.767 | 10.624 |

The largest and the smallest magnification value corresponding to the first illustrative embodiment are listed in the preceding table and the corresponding zoom ratio is approximately the ratio of those two figures. When distortion of the system is taken into account, the zoom ratio is 2.3.

Second Illustrative Embodiment

The compact viewfinder 200 represented in FIG. 2 is a 2.8×real image zoom viewfinder. The viewfinder may occupy a space 39 mm long, 25 mm wide and 21 mm high. The viewfinder 200 has an optical axis 201 and includes four optical units 210, 220, 230 and 240. The optical unit 210 of the first embodiment is stationary, i.e., does not move along the optical axis for zooming, but may move laterally (i.e., side to side) for parallax correction as discussed above for the first illustrative embodiment, and consists of a negative lens component 10′. Lens component 10′ is a single biconcave lens element having a front surface 12′ and a rear surface 14′. Surface 14′ has a smaller radius of curvature than surface 12′ and thus is more powerful than surface 12′ Surface 14, is also aspherical. The specific parameters describing this lens element are given in Table 4.

The second optical unit 220 moves axially during the zooming action to effect a magnification change. The second optical unit 220 consists of a positive lens component 20 . Lens component 20′ is a single biconvex lens element having a front surface 22′ and a rear surface 24′. Surface 24′ is an aspherical surface. The specific surface parameters for this lens element are also given in Table 4.

The third optical unit is a reflective assembly 230. The third optical assembly of the second illustrative embodiment consists of two subunits. The first subunit is comprised of mirrors M1 and M4. The second group subunit is comprised of two mirrors M2 and M3. The magnification of the zoom viewfinder is changed by moving the second optical unit 220 along the optical axis 201 while moving mirrors M2 and M3 vertically at the same time. That is, mirrors M2 and M3 move in an up and down direction in response to moving of the optical unit 220. Since the image plane, located between mirrors M2 and M3, drifts axially between the mirrors by about 5.6 mm, a field stop thickness should be 5.6 mm or larger.

The fourth optical unit 240 which is rearmost contains a positive lens component 40′ and is stationary. Lens component 40′ is a biconvex lens element having a front surface 42′ and a rear surface 44′. Surface 44, is an aspherical surface.

Various constructional parameters of the optical system, when in its short focal length conditions, are given in Table 4.

TABLE 4

|  | RADIUS | THICKNESS | MATERIAL TYPE |
|---|---|---|---|
| Lens element 10' | −24.1866 | 1.00 | acrylic |
|  | 14.2806 (3) | Z1 (1) |  |
| Lens element 20' | 11.6342 | 2.70 | acrylic |
|  | −13.2610 (4) | Z2 (2) |  |
| Lens element 40' | 92.0099 | 3.10 | acrylic |
|  | −10.7746 (5) | 22.24 |  |

(1) (2) Zoom space. Refer to ZOOM DATA TABLE.
(3) (4) (5) Aspherical surface. Sag is defined per following formula:

$$z = \frac{cy^2}{1 + \sqrt{[1 - (1 + k)c^2 y^2]}} + Dy^4 + Ey^6 + Fy^8 + Gy^{10} + Hy^{12} + Iy^{14}$$

where 1/C is radius of curvature for the surface, and K is the conic constant of the surface.

TABLE 5

| POLYNOMIAL ASPHERES (COEFFICIENTS OF THE EVEN POWERED TERMS) | | | |
|---|---|---|---|
| NO. | D (4th) | E (6th) | F (8th) |
| 3 | −6.6976E − 04 | 3.0536E − 05 | −2.0633E − 06 |
| 4 | 6.9506E − 05 | −2.2428E − 05 | 2.6700E − 06 |
| 5 | −7.7865E − 06 | 1.4656E − 06 | −6.9094E − 08 |
| NO. | G (10th) | H (12th) | I (14th) |
| 3 | 3.1544E − 08 | 2.6902E − 09 | −7.8763E − 11 |
| 4 | −6.5908E − 08 | −2.5406E − 09 | 9.6469E − 11 |
| 5 | −1.2694E − 10 | 3.3673E − 11 | −2.9428E − 13 |

| CONIC CONSTANTS | | | | | |
|---|---|---|---|---|---|
| NO. | VALUE | NO. | VALUE | NO. | VALUE |
| 2 | −5.81581E − 01 | 4 | −6.59321E + 00 | 6 | −1.28134E + 00 |

TABLE 6

| ZOOM SPACING DATA | | |
|---|---|---|
| POS | Z1 | Z2 |
| 1 | 24.0833 | 35.5000 |
| 2 | 12.1651 | 39.1547 |
| 3 | 4.6981 | 45.3670 |

In the embodiment described the lens powers are chosen so that the principal rays are nearly parallel at the intermediate image, thus eliminating the need for a field lens. Furthermore, using only one type of optical material, such as acrylic, the lateral color may be corrected for zoom ranges extending to at least 3:1. To further simplify construction, the first lens element can be fixed, and the vertical spacing between the upper and lower portions of the reflective unit can be altered as the variator lens component moves during zooming to provide the compensating motion. This results in a less complex system of three lens elements, one of which is moved for zooming, and a zero power mirror subsystem which is moved for compensating the shift in image location. By moving this mirror subsystem, however, the image location moves axially between the lower reflective components in order to remain fixed at the front focal plane of the eye lens. Therefore, for a fixed field mask to be positioned at the image location, it must be of sufficient finite thickness to enable its edges, which define the field of view, to be in constant sharp focus despite the axial shift of the image between the lower reflective components. That is, the field mask thickness must equal or exceed the total axial shift of the image between the lower reflective components. Otherwise, the complexity of a linkage for movement of a thin field mask in response to the axial movement of the image between the lower reflective components, is required. A further advantage of the fixed first element is that it may be moved laterally (i.e, side to side) to provide correction for parallax.

It should be obvious that weak optical components which do not significantly alter third order aberration corrections or the like might be added, but the term "lens element" or "lens component" is not intended to include such element or component for purposes of the present application.

It should be obvious that prisms can be used as well as mirrors.

For example, in the second illustrative embodiment mirrors M2 and M3 can be substituted by a prism and the design will still fall within the spirit of our invention. The finder may be provided with a delineated central aiming area. Thus, an etched plano plate, colored dot or wire reticle can be located at the real image plane.

The invention has been described in detail with particular reference to several presently preferred embodiment, but it will be understood that variations and modifications can be effected within the spirit and scope of the invention.

There has thus been described an optical system having a plurality of optical elements and an internal image that drifts between its optical components. This system has a three dimensional field mask, that has a thickness substantially equal or greater than the size of the image drift.

We claim:

1. A zoom viewfinder system comprising a plurality of optical components defining an internal image that drifts between the optical components, said viewfinder system further including a three-dimensional field mask, said mask having a thickness substantially equal to or greater than the size of the image drift.

2. A zoom viewfinder system comprising three optical units each having optical power, the system having a minimum of three lens elements each having refractive optical power and one of which optical units is movable for zooming and including an additional reflective optical unit movable for zooming, said reflective optical unit including reflective optical components between two of which an image plane drifts in response to movement during zooming and a three-dimensional field mask, said field mask having a thickness substantially equal to or greater than the size of the image plane drift of the image plane located between said reflective components.

3. An optical system comprising a plurality of optical components defining an internal image that drifts between the optical components, said viewfinder system further including a three-dimensional field mask, said mask having a thickness substantially equal to or greater than the size of the image drift.

4. An optical system according to claim 3, wherein said optical components comprise three optical units having optical power, wherein one of which optical units is movable for zooming.

5. An optical system according to claim 4 further including a reflective optical unit.

6. A zoom viewfinder system comprising a plurality of optical units each having refractive optical power and one of which optical units is movable for zooming and including an additional reflective optical unit also movable for zooming, said reflective optical unit including reflective optical components between two of which an image plane drifts in response to movement during zooming and a three-dimensional field mask, said field mask having a thickness substantially equal to or greater than the size of the image plane drift of the image plane located between said reflective components.

7. A zoom viewfinder system comprising a plurality of optical units each having optical power and one of which optical units is movable over a defined range for zooming, said optical units defining an intermediate image plane which drifts in response to movement of said optical unit over said range during zooming and a three-dimensional field mask, said field mask having a thickness substantially equal to or greater than a total amount of drift of the image plane.

8. A zoom viewfinder system comprising a plurality of optical units each having refractive optical power and one of which optical units is movable for zooming and including an additional reflective optical unit movable for zooming, the optical units cooperating to define an intermediate image plane which drifts in response to movement of optical units during zooming and a three-dimensional field mask, said field mask having a thickness substantially equal to or greater than the amount of the image plane drift.

* * * * *

UNITED STATES PATENT AND TRADEMARK OFFICE
CERTIFICATE OF CORRECTION

PATENT NO. : 5,155,517
DATED : October 13, 1992
INVENTOR(S) : Ellis I. Betensky, et. al.

It is certified that error appears in the above-indentified patent and that said Letters Patent is hereby corrected as shown below:

Title page, item [19] and [57], inventor's last name change "Bentensky to --Betensly--.

Column 4, line 67, chane "44" to --44'--.

Signed and Sealed this

Twenty-sixth Day of April, 1994

*Attest:*

BRUCE LEHMAN

*Attesting Officer*  *Commissioner of Patents and Trademarks*